United States Patent [19]

Holmes

[11] 4,243,719
[45] Jan. 6, 1981

[54] LAMINATES

[75] Inventor: Alan Holmes, Riding Mill, England

[73] Assignee: Romag Holdings Ltd., Blaydon-on-Tyne, England

[21] Appl. No.: 7,762

[22] Filed: Jan. 29, 1979

[30] Foreign Application Priority Data

Jan. 30, 1978 [GB] United Kingdom ............... 3645/78

[51] Int. Cl.³ .................... B32B 27/36; B32B 27/30; B32B 27/42; B32B 17/10
[52] U.S. Cl. ................................ 428/411; 156/99; 156/106; 156/334; 428/412; 428/426; 428/437; 428/442; 428/501; 428/520; 428/522; 428/524; 528/904
[58] Field of Search ............. 428/437, 426, 442, 412, 428/411, 501, 524, 522, 520; 528/904; 156/99, 106, 334

[56] References Cited

U.S. PATENT DOCUMENTS

| | | |
|---|---|---|
| 2,464,826 | 3/1949 | Neher ............................ 428/437 |
| 3,459,584 | 8/1969 | Caldwell ....................... 428/412 |
| 3,532,590 | 10/1970 | Priddle ......................... 428/412 |
| 3,539,482 | 11/1970 | Stewart ........................ 528/904 |
| 3,635,756 | 1/1972 | Shephard ...................... 428/442 |
| 3,652,379 | 3/1972 | White ........................... 428/412 |
| 3,922,440 | 11/1975 | Wegwerth .................... 428/437 |
| 3,935,367 | 1/1976 | Merrill .......................... 528/904 |
| 4,027,061 | 5/1977 | Cartier ......................... 428/437 |
| 4,059,469 | 11/1977 | Mattimoe ..................... 428/437 |
| 4,112,171 | 9/1978 | Motter .......................... 428/437 |
| 4,121,014 | 10/1978 | Shaffer ......................... 428/412 |

FOREIGN PATENT DOCUMENTS

2313207 12/1976 France .................................. 428/412

Primary Examiner—Ellis P. Robinson
Attorney, Agent, or Firm—Wenderoth, Lind & Ponack

[57] ABSTRACT

The present invention provides a reinforced glass laminate, comprising a non-hydrophilic synthetic resin, at least one surface of which has been rendered hydrophilic by bonding thereon a layer of a hydrophilic material, a layer of hydrophilic synthetic resin being bonded to said layer of hydrophilic material and a layer of glass being bonded to said layer of hydrophilic synthetic resin.

The present invention also provides a process for producing a reinforced glass laminate, wherein a non-hydrophilic synthetic resin is coated with a solution capable of forming a layer of a hydrophilic material thereon, the solvent medium is then removed, a hydrophilic synthetic resin is placed on the layer of hydrophilic material and glass is then placed on the hydrophilic synthetic resin, whereafter bonding together of the layers is achieved either by applying an increased pressure at an elevated temperature or by heating under reduced pressure.

10 Claims, 6 Drawing Figures

LAMINATES

The present invention is concerned with synthetic resin/glass laminates with an excellent transparency and impact resistance and possessing good resistance to surface damage by external agents, especially chemical, solvent and abrasive agents, and is also concerned with the production and processing of such laminates.

It has long been recognised that certain synthetic resins possess desirable qualities, such as transparency, heat resistance, low density, resistance to impact and the ability to store elastic energy. However, most plastics having these properties are susceptible to surface damage by chemical or mechanical processes, especially solvent action or surface scratches. This is a critical factor when these materials are considered for glazing or eye protection. Similarly, certain glasses have excellent properties, such as transparency, resistance to surface damage, ease of cleaning and high refractive index, which contribute to the cosmetic appeal of articles made of glass materials. Furthermore, many transparent glass compositions can be significantly toughened by thermal or chemical processing, rendering the material even more resistant to scratching and general mechanical damage. The desirability of combining the best properties of both glass and synthetic resins is thus apparent and has been the object of much investigation within the laminated glass industry.

It is known to bond glass to glass using a transparent interlayer material based upon plasticised or unplasticised polymers. These interlayer materials generally depend upon bonding to the hydrophilic surface of a glass component, the hydrophilic properties of the surface being attributed to a molecular bonded film of water present upon silicate surfaces at near ambient temperatures and at normal levels of relative humidity. Polymers utilised in the bonding process may themselves be mildly or strongly hydrophilic: for example, polyvinylbutyral plasticised with triethylene glycol di(2-ethylbutyrate) is mildly hydrophilic and, in addition to its hydrophilic nature, has vicinal aldehyde and other moieties which contribute to its bonding ability. Other polymer-based interlayer materials include, for example, cellulose acetate plasticised with dimethyl phthalate or dibutyl phthalate, plasticised or unplasticised cellulose caprate, cellulose butyrate, cellulose propionate, poly 4-hydroxynitrostyrene, polyhydroxyalkyl acrylates and methacrylates, polyvinylformal and the like. It would be economically very attractive to be able to utilise these materials to bond highly impact resistant transparent synthetic resins to glass substrates, for example to bond a polycarbonate sheet to a soda-lime glass sheet. However, when this is attempted, the synthetic resin does not bond well to the polymer interlayer material, may distort and become stressed due to processing temperatures and may suffer from crazing, splitting, stress cracking or loss of transparency and impact resistance.

A glass/polymer interlayer, for example glass-/polyvinyl butyral plasticised resin interlayer has an inherently strong bond and, in considering the bonding of an impact resistant transparent plastics material to glass, it would seem that from theoretical considerations, it should be easier to bond to an existing interlayer polymer material rather than to a pristine glass surface via a polymer material adapted to be compatible with the generally hydrophilic glass surface and generally hydrophobic plastics material surface.

Thus, it is an object of the present invention to modify the surface properties of an impact resistant transparent plastics material so that it can be directly bonded to a polymer interlayer without stress cracking or related effects or loss of transparency and can thus form a glass-/polymer interlayer/impact resistant plastics material laminate.

We have now found that it is possible to modify the generally hydrophobic surface of impact resistant, transparent synthetic resins by rendering the surface thereof hydrophilic and thereby enabling a satisfactory bond to an existing hydrophilic polymer interlayer to be produced.

Thus, according to the present invention, there is provided a reinforced glass laminate, comprising a non-hydrophilic synthetic resin, at least one surface of which has been rendered hydrophilic by bonding thereon a layer of a hydrophilic material, a layer of hydrophilic synthetic resin being bonded to said layer of hydrophilic material and a layer of glass being bonded to said layer of hydrophilic synthetic resin.

According to a preferred embodiment of the present invention, there is provided a laminate which is glass-clad on only one surface thereof, which comprises a nonhydrophilic synthetic resin, one surface of which has been rendered hydrophilic by bonding thereon a layer of a hydrophilic material, a layer of hydrophilic synthetic resin being bonded to said layer of hydrophilic material and a layer of glass being bonded to said layer of hydrophilic synthetic resin.

According to another preferred embodiment of the present invention, there is provided a laminate which is glass-clad on both surfaces thereof, which comprises a non-hydrophilic synthetic resin, both surfaces of which have been rendered hydrophilic by bonding thereon layers of a hydrophilic material, a layer of hydrophilic synthetic resin being bonded to each layer of hydrophilic material and a layer of glass being bonded to each layer of hydrophilic synthetic resin.

The present invention also provides a process for producing a reinforced glass laminate, wherein a non-hydrophilic synthetic resin is coated with a solution capable of forming a layer of a hydrophilic material thereon, coating being carried out, for example, by dipping, spraying, rolling or knife coating or by electrostatic droplet precipitation, the solvent medium is then removed, a hydrophilic synthetic resin is placed on the layer of hydrophilic material and glass is then placed on the hydrophilic synthetic resin, whereafter bonding together of the layers is achieved either by applying an increased pressure at an elevated temperature or by heating under a reduced pressure, which is preferably not below 10 mm.Hg and is desirably 40 to 300 mm.Hg.

In general, there is no limit to the type of nonhydrophilic synthetic resin which can be used and subsequently bonded to glass according to the present invention, except that it should have solvent compatibility with the solvent used to dissolve the hydrophilic material and any adjuvants used. Synthetic resins, such as polytetrafluoroethylene and poly-(2,6-dimethylphenylene oxide), which are insoluble in common solvents, can be bonded but the bond between the synthetic resin and the hydrophilic material is basically topotactic and hence not very strong. Synthetic resins which have been bonded to give a strong and usable bond include polymethylmethacrylate and other (meth) acrylic polymers, such as "Perspex", polycarbonates, such as 4,4'-isopropylidene-diphenol polycarbonate (for example "Lexan"), poly-(diethylene glycol-bis-(allyl carbonate)), polysulphones (for example "Udel"), polyether sulphones (for example "Victrex"), cellulose acetate, cellulose acetate/butyrate, cellulose acetate/propionate, polystyrene, pyroxilin (film)-cellulose nitrate, poly(triallyl cyanurate), polyacrylonitrile and the like. ("Perspex", "Lexan", "Udel" and "Victrex" are Registered Trade Marks).

The above-mentioned synthetic resins are generally available in transparent form and give an optically acceptable bonded laminate with glass which is suitable for vision purposes.

Non-transparent synthetic resins which have been laminated according to the present invention include polyethylene terephthalate, polyvinyl chloride, nylon 6 (polymerised caprolactam), polyvinyl acetate, polyethylene (as rigid sheet), vinylidene chloride/acrylonitrile co-polymer and polymers based on pyromellitic dianhydride, co-polymerised for example with chlorendic acid.

Filled or coloured synthetic resins can also be bonded to glass; for example carbon fibre-filled polycarbonate, injection moulded in 100 mm. × 100 mm. × 12 mm. slabs, has been bonded to 6 mm. plates of toughened or untoughened glass to give a strong laminate which is useful as a lightweight composite armour, which can be used, for example, in flak-jackets or as vehicle armour.

Synthetic resin polarising filters can be bonded between glass in various plys and thicknesses and used in a vision block for a fighting vehicle. Alternatively, a glass polarising filter can be bonded to a polycarbonate substrate.

Widely varying types of synthetic resin may be bonded into glass/plastic laminates of many layers thickness. Up to 18 layers of glass/polycarbonate/polysulphone/polymethyl methacrylate have been produced. There are some limitations to the types which may be bonded, depending upon the relative thermal expansions of the separate components. In general, the polymer interlayer is effective in absorbing differential linear expansion of various synthetic resins.

The material used to impart hydrophilic properties to the surface of the non-hydrophilic synthetic resin can be a hydrophilic homopolymer, heteropolymer or copolymer, at least one of the component monomers or precursors being the monomer of a hydrophilic polymer, such materials including hydroxyalkyl acrylates, hydroxyalkyl methacrylates, hydroxyalkoxy-alkyl acrylates and hydroxyalkoxy-alkyl methacrylates, for example 2-hydroxyethyl acrylate, 2-hydroxyethyl methacrylate, 2-hydroxypropyl acrylate, 2-hydroxypropyl methacrylate and propylene glycol monomethacrylate, especially preferred monomer materials including 2-hydroxyethyl methacrylate and 2-hydroxypropyl methacrylate. An essential feature of such a polymer is obviously the extent of its hydrophilic properties, which determine its compatibility and bonding with the interlayer of hydrophilic material when used to form a laminate with glass. The polymers used according to the present invention are insoluble in water but readily soluble in organic solvents, for example, ethanol, methanol, N-methyl-2-pyrrolidone and other organic solvents.

In bulk form, both polyhydroxyethyl methacrylate (poly-HEMA) and polyhydroxypropyl methacrylate (polyHPMA) are rather brittle materials and, if used alone to treat a synthetic resin surface, may suffer from cracking if the synthetic resin is flexed. It is desirable to co-polymerise or cross-link to one or more other materials to give greater flexibility and strength to the dry film. When the laminate is formed, the normally brittle film absorbs some water, forming a diffusion-resistant hydrogel and thus giving it extra flexibility. Furthermore, when used, for example, as gas mask lenses, which are subject to cleaning or decontamination by wet methods (for example spin-washing in a 2% by weight aqueous solution of a sodium alkyl/aryl sulphonate at 65° C.), a bond based purely on a poly 2-hydroxyethyl methacrylate or poly 2-hydroxypropyl methacrylate is subject to slight degradation around the edges of the laminate. Therefore, it is desirable to cross-link other materials with the hydrophilic polymer to give increased resistance to attack by detergents or surfactants used during cleaning and decontamination procedures, for example an ethylenically-unsaturated acid or an ethylenically-unsaturated amine, preferably together with an ethylenically-unsaturated amide, for example acrylamide.

HEMA and HPMA always contain a small quantity of ethylene glycol dimethacrylate (usually about 0.2–0.4% by weight), formed by disproportionation of the parent monomer. In addition, commercial or polymer grade HEMA or HPMA usually contains a stabiliser, such as 4-methoxyphenol, present, for example, in an amount of 0.02% to 0.04% by weight, to prevent spontaneous polymerisation of the monomer. This in no way impairs the properties of the polymerised product; indeed, it can be advantageous to have present a small quantity, for example 2% by weight, of a monomer, such as ethylene glycol dimethacrylate, since it contributes to the general mechanical strength of the hydrophilic polymer on the surface of the synthetic resin treated therewith.

An important feature in the production of the composite laminate is the preparation of a solution of the hydrophilic polymer, for example of poly-HEMA or poly-HPMA.

In order to prevent gross cross-linking or insolubilising of the hydrophilic polymer, the monomer is polymerised in solution, a preferred solvent being N-methyl-2-pyrollidone. As catalysts necessary for inducing polymerisation, free-radical catalysts are generally preferred, for example benzoyl peroxide, lauroyl peroxide, dicumyl peroxide, 2,2'-azo-bis-(2-methyl-propionitrile), tert.-butyl peroctoate, methyl ethyl ketone peroxide and the like. The catalyst or catalyst mixture is usually employed in an amount of from 0.05 to 0.5% by weight, referred to the monomer, 0.2 to 0.4% by weight usually ensuring satisfactory polymerisation. Ultraviolet light or radiation may be employed to polymerise the monomer in solution. Polymerisation can be carried out at ambient temperature or at a temperature of up to 160° C. or even higher, one method which has been employed to produce a solution of poly-HPMA in N-methyl-2-pyrollidone being as follows:

In a glass reactor of 25 liters capacity, there are placed 2000 g. commercial grade hydroxypropyl methacrylate (containing approximately 0.2% by weight ethylene glycol dimethacrylate, 0.03% by weight 4-methoxyphenol and approximately 0.6% by weight absorbed water), 8000 g. N-methyl-2-pyrollidone, 30 g. dicumyl peroxide and 10 g. 2,2'-azo-bis-(2-methylpropionitrile). After stirring to ensure homogeneity, the reaction vessel is heated to 110° C. and held at this temperature for approximately 1 hour. The resulting viscous syrup is an approximately 20% solution of poly-HPMA in N-methyl-2-pyrollidone.

N-methyl-2-pyrollidone is a preferred solvent for two main reasons:

1. Its boiling point is high (202° C.) and it can easily take up the heat of polymerisation without suffering apprecialbe volatile loss.

2. It is an excellent solvent for many synthetic resins and for many polymer intermediates.

The polymer prepared as above is insoluble in water. It can be readily precipitated by pouring the viscous solution into an excess of water, with rapid stirring, to give a white, fibrous polymer containing absorbed water, which is readily soluble in methanol, ethanol, isopropanol and the like.

Other solvents or mixtures of solvents may be used as the liquid medium in which the polymerisation is carried out, for example, ethanol, methoxyethanol, tetrahydrofurfuroxytetrahydropyran, dimethyl formamide, diethyl carbonate, 2-butoxyethanol, methyl ethyl ketone and the like.

In selecting a solvent or solvent mixture for the hydrophilic polymer, it is useful to consider the solubility parameter of the solvent in relation to the polymer material, the solubility parameter being a numerical constant directly related to the solvent and the polymer which is an evaluation of the measurement of the force by which the molecules attract each other. A solvent for a polymer must have a solubility parameter or value within the polymer range if the polymer is to be soluble. Thus, the solubility parameter of 11.00 for N-methyl-2-pyrollidone generally covers the solubility parameter ranges of a wide range of synthetic resins and polymers.

When preparing a solution of a hydrophilic polymer material for the pre-bonding treatment of a non-hydrophilic synthetic resin, it may be necessary to include other materials, such as surfactants, to ensure initial adequate wetting of the surface, for example polyoxyethylene sorbitan monooleate. The addition of low viscosity solvents to the polymer solution is generally effective in reducing surface 'creep' when, for example, dipping a polycarbonate sheet into a mixture of solvents containing a hydrophilic polymer, such as poly-HEMA, and additional cross-linking agents. Thus, the addition of 30% of chloroform may ensure a sharply defined contact level with the synthetic resin, depending upon the particular solvent composition.

Dipping synthetic resin sheets into a particular mixture of polymers and intermediates, followed by drying, has been found to be an effective method of coating pieces of synthetic resin intended for vision applications when finally laminated. On larger pieces, spraying, rolling and other methods have been used, for example when producing a motor-cycle helmet visor from a glass/polymer laminate, using polycarbonate. Coating a polycarbonate component can, for example, be carried out by dipping into the following solution:

100 parts by weight of a 20% by weight solution of poly-HEMA in N-methyl-2-pyrollidone
130 parts by weight methanol
0–30 parts by weight chloroform
2 parts by weight itaconic acid (cross-linking agent)
0.1 part by weight dicumyl peroxide (catalyst)
0.25 parts by weight polyoxyethylene sorbitan monooleate
0.5–8 parts by weight of other cross-linking agents (e.g. acrylamide, "Araldite" CY212/dodecylsuccinic anhydride).

("Araldite" is a Registered Trade Mark).

The component is drained and, when free of mobile liquid, placed in a circulatory air oven at 125° to 136° C. for a period of up to one hour to cure and cross-link the polymer layer formed on the surface of the polycarbonate.

For producing the laminate according to the present invention, the following procedure can be used: a piece of glass is cut or shaped to the required size and a piece of hydrophilic synthetic resin interlayer and a piece of treated impact resistant non-hydrophilic synthetic resin are cut to the same size and sandwiched together in a clamp, with the application of light pressure. The sandwich is then heated to a temperature of from 70° to 130° C. until a partial bond is formed between the components. The clamp is removed after allowing the components to cool to a temperature below 70° C. The partially bonded assembly is then heated in an autoclave to a temperature of from 100° to 150° C. for a period of time of from 30 minutes to 6 hours at a pressure of from 70 to 250 psi in an atmosphere of air or nitrogen or in vacuo. After cooling to allow annealing, the pressure is reduced to ambient pressure and the bonded laminate is removed.

The interlayer of hydrophilic synthetic resin can be any material which provides an adequate bond between glass and the treated non-hydrophilic synthetic resin. Particularly good results have been obtained with polyvinyl butyral and polyvinyl formal, which can be used in high and low plasticised forms. Infra-red absorbing and coloured varieties of these materials can also be used.

The laminate can be used up to a temperature limited by the nature of the interlayer.

A particularly preferred method of production is to dip an optically-acceptable polycarbonate, polysulphone or polyether sulphone substrate in a flat stress annealed form into an appropriate mixture of solvents and polymer materials, together with necessary cross-linking agents, catalysts and the like, such a mixture being formulated to prevent stress-cracking and loss of optical quality in the substrate and generally containing a high proportion of N-methyl-2-pyrrolidone or other appropriate solvent. The mixture is preferably continuously cycled through a sub-micron filter to prevent contamination by airborne dust, plastic swarf and other particulate matter. The dipping/coating process is usually carried out in a high grade clean area to ensure good optical quality of the coated substrate.

After dipping, the substrate is allowed to drain for a pre-determined time: excess liquid can be removed, for example by wiping with clean polytetrafluoroethylene blades. The substrate is then placed in an air circulatory oven provided with air filters and the venting for solvent vapours. It is usually necessary to programme the heating cycle to obtain the best quality and anneal the substrate after evaporation of the solvent media. Thus, the maximum temperature at which the polymer materials cross-link and cure should be a few degrees Celsius below the glass transition temperature of the substrate material and the rate of cooling should be such as to allow the substrate to be strain-free upon reaching ambient temperature.

The quality of the coated, flat substrate may be assessed by viewing the substrate through a polarising filter, the substrate being trans-illuminated by polarised light. Micro stress-cracking and poor annealing can be determined in this manner since such effects are made easily visible as a patterned coloration.

After coating and annealing, the flat substrate can be cut to size, for example by punching, the surfaces of the coated substrate being suitably protected, for example, by polyethylene film. The cut piece can then be provided with any desired curvature by heating in a male/female match-mould to a temperature just above the glass transition temperature of the substrate material, followed by cooling to ambient temperature at a rate which allows good annealing.

The thickness of the hydrophilic polymer layer on the surface of the non-hydrophilic synthetic resin is not critical and can be varied as desired. However, it is generally 0.025 to 0.25 mm. and preferably 0.05 to 0.125 mm. but good results have also been obtained with greater thicknesses when transparency is not an important factor.

The above method eliminates 'edge-effects' caused by draining of a pre-formed piece, for example a helmet visor, and ensures the minimum possibility of solvent stress cracking in the substrate, such stress cracking being unacceptable when considering the bonding of the prepared non-hydrophilic substrate to a hydrophilic polymer interlayer material. When forming a curvature on a coated substrate, it is preferable to employ polythene-coated paper separators between the mould surfaces and the substrate in order to protect the surface thereof. Even at temperatures of 180° C., the polythene does not affect the layer of the hydrophilic polymer on the non-hydrophilic substrate surface.

A curved, hydrophilic coated non-hydrophilic substrate in a stress annealed form can be bonded to a cured glass component by means of a polymer interlayer material, such bonding generally being carried out by heating and, therefore, pre-bonding a sandwich of glass, hydrophilic polymer interlayer and hydrophilic coated non-hydrophilic substrate in intimate contact either in air to a temperature of 120°-125° C., followed by squeezing to remove entrapped air, or by heating to 105°-115° C. in vacuum. After pre-bonding, the sandwich can be cured by heating under pressure in an autoclave, for example when using a plasticised polyvinyl butyral interlayer material.

Alternatively, a liquid, hydrophilic, partially cured polymer can be injected into the space between a glass component and a hydrophilic coated non-hydrophilic plastics substrated, followed by curing by heat or exposure to ultra-violet light.

The glass used in the laminates according to the present invention can be any known type of oxide glass as understood by the glass processing industry, examples of glasses which can be used according to the present invention including soda glass, optical glass, window glass, silica glass, translucent glass, ground glass, coloured glass, silicate glass, materials with a vitreous surface, alumina glass and the like.

A particularly preferred type of glass is that known as microsheet glass, which is a very thin, flexible drawn glass. Laminates produced therewith have excellent transparency and vision properties, the microsheet glass protecting the surface of the laminate. Furthermore, such a laminate can be readily cut, sawed or drilled, without causing extensive cracking over the surface thereof. Thus, for example, a laminate comprising a polycarbonate and microsheet glass with a total thickness of 6.8 mm. can be drilled with a 6 mm. diameter drill giving a radius of shatter round the resulting hole of only 3.2 mm.

If desired, one or more of the components of the laminate, including the hydrophilic material used for coating the non-hydrophilic synthetic resin, can contain filter materials, polarising filter materials, infra-red filter materials and ultra-violet filter materials, as well as colouring materials.

Since some synthetic resin materials, such as polysulphones and polyether sulphones, are very susceptible to discoloration by ultra-violet light and sunlight, it is advisable to incorporate a cross-linked ultra-violet absorber in order to prevent such discoloration, such absorbers including, for example, ethyl 2-cyano-3,3-diphenyl-acrylate and 2-ethylhexyl-2-cyano-3,3-diphenyl-acrylate.

As mentioned hereinbefore, an essential feature of the present invention is the appropriate coating of an impact resistant non-hydrophilic synthetic resin with a layer of a hydrophilic material. In general terms, the solution with which the non-hydrophilic synthetic resin is contacted can be prepared from 15 to 180 parts by weight of at least one liquid having a boiling point in the range of from 18° to 110° C., which liquid does not cause stress cracking of the impact resistant synthetic resin, does not dissolve or attack the synthetic resin, has a low viscosity and completely dissolves the hydrophilic polymer and any adjuvant materials and is miscible with them in all proportions, such a liquid being, for example, methanol, ethanol, isopropanol, chloroform or the like; 5-85 parts by weight of at least one liquid having a boiling point in the range of from 80° to 220° C. and which normally dissolves, swells or softens the synthetic resin without causing stress cracking, crazing, fogging or other deleterious effects and which will dissolve the hydrophilic polymer and any adjuvant materials and is miscible in all proportions with them and is totally miscible with the first liquid, such a liquid being, for example, dimethyl sulphoxide, tetrahydrofurfuroxytetrahydropyran or N-methyl-2-pyrollidone; and 0.5-30 parts by weight of a hydrophilic polymer or hydrophilic cross-linked polymer or co-polymer, for example polyhydroxyethyl methacrylate or hydroxypropyl methacrylate/itaconic acid co-polymer.

To this combination there may be added 0.01 to 5 parts by weight of a surfactant or non-ionic detergent, for example polyoxyethylene sorbitan monooleate; polyoxyethylene lauryl ether or nonphenoxypoly-(ethyleneoxy)ethanol and 0.001 to 1 part by weight of a stabilising agent, for example p-methoxyphenol, tert.-butyl catechol or the like.

The non-hydrophilic synthetic resin is contacted with the solution, for example by dipping or spraying, for a period of from 0.5 seconds to 10 minutes, followed by draining off excess liquid for a period of from 5 seconds to 2 minutes, preferably at about ambient temperature. The synthetic resin material is then heated in an air-circulatory oven or drying chamber to a temperature of from 80° to 230° C., depending upon the nature and glass transition point of the synthetic resin being treated, provision being made for venting or removing organic vapours produced during the drying process. Drying is terminated when no more organic vapours are produced, whereafter the synthetic resin is cooled at a rate which permits good annealing.

A bonded hydrophilic polymer coating is thus formed on the surface of the non-hydrophilic synthetic resin, which coating is integral with the synthetic resin surface and is probably partly cross-linked to it. In addition to making the impact resistant non-hydrophilic synthetic resin bondable to glass via an interlayer, the hydrophilic polymer coating also imparts anti-fogging properties to the non-hydrophilic synthetic resin; thus, for example, when breathed upon, the bonded hydrophilic polymer film prevents droplets forming by initially absorbing water to form a completely wettable surface. It is known to produce hydrophilic coatings upon plastics surfaces which have anti-fogging properties (see, for example, British Patent Specification No. 1,205,767). When considering the production of an impact resistant glass/plastics lens or visor, it is obviously advantageous to leave a hydrophilic polymer surface exposed upon the eye side of the laminated article.

Gas masks and the like are exposed to a large variety of micro-organisms during use and storage and are usually required to be sterilised from time to time. By incorporating a biocidal agent into the hydrophilic resin solution used for coating the impact-resistant non-hydrophilic synthetic resin, it is possible to ensure adequate sterility, an amount of biocidal agent of up to about 1% by weight usually being sufficient. The film obtained is completely transparent and maintains its biocidal properties even after several washing cycles. A large variety of biocidal agents can be used and especially good results have been obtained with, for example, tri-n-butyl tin chloride, tri-octyl tin oxide, triphenyl lead acetate and the like. Such additions allow a transparent bond to be attained and do not detract from the stability of the cured and cross-linked hydrophilic polymer.

The amount of water present in the interlayer affects the bond strength, durability and resistance to high temperatures of the laminate. When the interlayer contains an optimum amount of water, it is said to be "conditioned", this amount of water generally being suitable for bonding with an initially dry hydrophilic polymer layer on an impact-resistant non-hydrophilic synthetic resin, i.e. a layer which contains less than 5% by weight of water. However, the amount of water present in the interlayer can be varied according to the intended application.

One of the great advantages of the laminates according to the present invention is the high degree of thinness which can be attained. Thus, it is possible to produce a laminate comprising microsheet glass/interlayer/hydrophilic resin-coated impact-resistant non-hydrophilic synthetic resin/interlayer/microsheet glass with an overall thickness of only 1.65 mm., this laminate having excellent optical properties and being especially suitable for eye protection, for example in motorcycle helmet visors and other visors intended to protect the eyes and face, including gas mask lenses. It is, of course, also possible to produce much thicker laminates which have a good resistance to bullets, bomb fragments and the like, which are especially suitable for armoured vehicles, bank protective screens and lamp glasses for miners' lamps.

The laminate of the present invention is especially useful in nuclear engineering since it is a transparent material which is suitable for vision applications but which has virtually 'fail-safe' properties; in conventional glove box or chamber windows, laminated glass may shatter and fail, for example by explosion of a chemical flask. An all polycarbonate window would not fail but presents difficulty in internal cleaning and decontamination if radio-active materials are involved.

A laminate for vision applications can contain a heated outer/inner glass layer. The heating elements can comprise a vapour-deposited grid of a transparent conductive material, such as doped tin oxide, doped indium oxide or gold, through which an electric current can be passed. Alternatively, a glass pane containing enclosed metallic wires can be bonded. Furthermore, in flat or curved laminates, the outer pane can be toughened, either thermally or chemically.

The laminates can be used for double glazing, the void-free construction obviating the need for edge sealing, where condensation problems arise, and the low thermal conductivity of the layers ensuring good insulating conductivity of the layers ensuring good insulating properties.

The laminates are especially useful for explosionblast resistance. For instance, a glass-clad (0.8–1 mm. glass each side) 6 mm. to 12 mm. thick polycarbonate window is capable of withstanding, without failure (although cracking of glass may occur), explosive blast overpressures vastly in excess of those which cause complete mechanical failure of a conventional "all glass" (i.e. glass/polyvinylbutyral) window. In addition, fragments of glass ejected from the surface of the laminate are minimal and, because of the thinness of the glass, are very small and easily stopped.

The laminates have good sound insulating properties and can be employed in sound suppressing applications, this application, combined with their impact resistance, making them especially useful for machine covers, guards and the like.

Miners' cap lamp glass, for example of 3 to 3.5 mm. thickness, can be made of a glass/polycarbonate laminate having a toughened glass outer layer and a polycarbonate inner layer. This laminate is especially useful in explosive atmospheres since, even if the outer glass ply breaks due to impact, no gas is admitted to the lamp head, which normally houses a switching arrangement and hence can generate electric sparks.

A vandal-proof parking metal glass comprising a glass/polycarbonate laminate and having, for example a 1.2–1.4 mm. thick glass outer layer and a 6 mm. thick polycarbonate inner ply prevents damage to the internal mechanism of a parking meter.

The laminate can also be used as a cover for lighting or electrical apparatus in flame-proof applications, for example in coal mines and chemical plants. When sealing the laminates into frames, cold curing silicone elastomers can be used, which also prevent the ingress of fluids.

The laminate can be made in the form of discs, for example 150 mm. diameter × 12 mm. thick, for use as vision ports in vacuum systems. Such laminates are also useful as windows in submarine vessels or in aircraft where a pressure differential exists between the outer and inner ply of the laminate.

The laminate can be used in the form of a goggle lens for ski-goggles, for example 2.5 mm. thick and having an outer glass pane or surface and an inner polycarbonate or other plastic pane, which may or may not be tinted, as well as in the form of motor cycle goggle lenses or lenses for general eye protection, such as safety spectacle lenses, which can be, for example, 3 mm. thick (1.2–1.4 mm. glass, 1.6 mm. polymers).

The laminate can be fabricated as an impactresistant cover for display devices, such as light-emitting diode displays or neon discharge or fluorescent indicators, either the glass, the interlayer or the nonhydrophilic synthetic resin optionally being tinted or containing a circular polarizing filter to enhance the legibility of a display and can also be used in the form of an impact-resistant cover for liquid crystal or photochromic displays, optionally incorporating an ultraviolet absorber to prevent photodegradation of the display, for example by solar radiation.

The laminate can be used in the form of a cover for a pressure gauge, flow gauge or the like where there is a possibility of an explosive release of gas following failure of the gauge or of its component parts.

The laminate in the form of a cover for a fighting vehicle headlamp or sidelamp, for example with a circle diameter 115 mm. and a thickness of 12 mm., is resistant to small arms fire and flying fragments. The laminate can also be used as a cover for an airfield landing lamp.

The laminate can be used in the form of a deck lamp of the type which is usually mounted flush or almost flush with the deck surface and having an outer exposed component made from either flat, shaped or moulded glass and an inner impact resistant substrate of synthetic resin.

The laminate can be used as a visor for a fire fighting suit, for example 25×15 cm. (flat size) curved in one plane to a radius of 113 mm. and having an outer pane of glass (which may or may not have a reflecting layer of gold or aluminium) and an inner pane of polycarbonate or polysulphone or polyether sulphone. Using an interlayer based on polyvinyl butyral, core temperatures within the laminate may reach 90°–100° C. without catastrophic failure, the visor still retaining good impact resistance at these temperatures, especially where polysulphone or polyether sulphone is used as the inner pane.

The laminate can be used for security purposes where the exposed surface glass plate carries a grid of sensing wires or a vapour-deposited conductive pattern or a conductor is deposited upon its surface(s) so that, in the event of an attack upon the laminate, if surface damage is sustained, breaking the conductive pattern or grid, it triggers an alarm via an electric circuit, the basic strength of the laminate being virtually unchanged since it is a function of the polymer strength beneath the sensing glass.

The laminate can be used as a rigid constructional material, for example in table tops, shelving and the like. It may be drilled and fixed in the same way as glass or synthetic resin alone.

The laminate, when transparent, especially a glass-/polymethyl methacrylate laminate, possesses excellent light transmission through the polymer layer and may be utilised as 'light pipes' or light guides for the illumination of objects or simply for aesthetic appeal, for example in edge-lit shelving.

The laminate can be used for all types of automobile screens, windshields, side windows and the like, as well as for motorcycle windshields.

Figure 2:
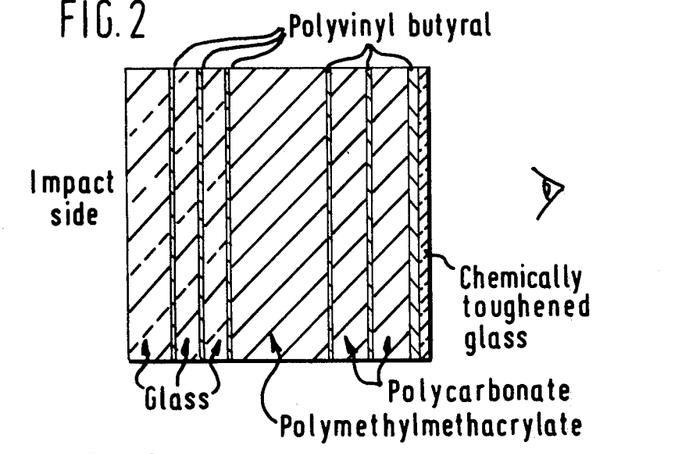
FIG. 2 illustrates a preferred embodiment of the present invention which is glass-clad on only one surface thereof with chemically toughened glass.

When multiple ply laminates are considered in security glazing applications, it is convenient and desirable to include differing plastics materials having different comminution factors, the comminution factor being the amount of energy absorbed by a given mass of material when it is reduced to small fragments or comminuted. Thus, in considering a glass/plastics composite laminate intended for high velocity impact protection, it is advantageous to have several glass layers (which may be bonded together with a polymer interlayer) bonded to one or more polymethyl methacrylate layers, the surfaces of which have been rendered hydrophilic, which is, in turn, bonded to one or more polycarbonate layers, the surfaces of which have been rendered hydrophilic and may thus form a complete composite, a cross-section of which is shown in FIG. 2 of the accompanying drawings. When struck by a high velocity projectile, the glass layer(s) and the polymethyl methacrylate layer(s) undergo gross comminution to small fragments, the polycarbonate layer(s) absorbing the residual energy of impact by elastic deformation.

Such laminates can be used, for example, for bullet resistant glazing, shotgun resistant glazing, machine guards, transparent vehicle armour and the like.

When used for vision applications, it is desirable to bond a further glass layer, which is usually very thin, to the eye side of the composite laminate. This may be chemically toughened to give freedom from fragmentation and also to provide scratch resistance and chemical protection. Panels of laminate produced for bullet-resistant glazing applications can be up to 60% lighter than conventional laminated glass panels of similar thickness.

The following Examples are given for the purpose of illustrating the present invention:

EXAMPLE 1

The following components were charged into a 3-liter glass reaction vessel, fitted with a stirrer and heating mantle:

1,000 parts by weight N-methyl-2-pyrollidone
300 parts by weight 2-hydroxypropylmethacrylate (HPMA)
22 parts by weight itaconic acid (propylenedicarboxylic acid)
6 parts by weight ethylene glycol dimethacrylate
4 parts by weight dicumyl peroxide
2 parts by weight 2,2'-azo-bis-(2-methylpropionitrile) (AZBN)

After stirring to achieve solution, the resulting mixture was heated to 115° C. and maintained at this temperature for approximately 40 minutes. After cooling to ambient temperature, the resulting viscous polymeric gel was dispersed in 3,900 parts by weight anhydrous methanol, using a high-speed stirrer fitted with a high-shear blade. After complete dispersion and dissolving, the following components were added thereto:

3 parts by weight polyoxyethylene (20) sorbitan monooleate
4 parts by weight ethylene glycol dimethacrylate
10 parts by weight 2-ethylhexyl-2-cyano-3,3'-diphenyl acrylate This solution, which was found to be unstable in light, was stored in a refrigerator until needed (solution A). Two panels of 6 mm. thick polycarbonate (370×370 mm.) were cleaned by immersion in an ultrasonic bath containing filtered anhydrous methanol and a panel of 13 mm. thick polymethyl methacrylate was also cleaned in a similar manner.

The polycarbonate and polymethyl methacrylate sheets were immersed in solution A for about 60 seconds. The polycarbonate sheets were then removed from the solvent and placed in an air circulatory oven at a temperature of 120° C. and the temperature was raised to 135° C. over a period of 6 minutes and held at this temperature for a period of 30 minutes.

Similarly, the polymethyl methacrylate sheet was placed in an oven at 100° C. and raised to a temperature of 112° C. for a period of 20 minutes.

The surfaces of both plastics materials were thus rendered hydrophilic by curing thereon a bonded layer of a hydrophilic co-polymer.

The above procedures were carried out under 'clean room' conditions to prevent impairment of the optical properties of the plastics.

An assembly of the plastics sheets, plasticised polyvinylbutyral interlayer material and glass components of the same size (370 mm. × 370 mm) (see FIG. 2 of the accompanying drawings in which the layers forming the hydrophilic surfaces have been omitted for the sake of simplicity) was then assembled, using a heat-resistant tape to hold the assembly together. The structure of the assembly was as follows:

1st layer 10 mm. thick soda lime glass (impact side)
2nd layer 0.76 mm. thick plasticised polyvinylbutyral resin
3rd layer 6 mm. thick soda lime glass
4th layer 0.76 mm. thick plasticised polyvinylbutyral resin
5th layer 6 mm. thick soda lime glass
6th layer 0.76 mm. thick plasticised polyvinylbutyral resin
7th layer 13.0 mm. thick polymethyl methacrylate (hydrophilic surfaces)
8th layer 0.76 mm. thick plasticised polyvinylbutyral resin
9th layer 6.0 mm. thick polycarbonate (hydrophilic surfaces)
10th layer 0.76 mm. thick plasticised polyvinylbutyral resin
11th layer 6.0 mm. thick polycarbonate (hydrophilic surfaces)
12th layer 1.52 mm. thick plasticised polyvinylbutyral resin
13th layer 1.2 mm. thick soda lime glass (vision side)

The assembly was clamped between cast aluminium plates (480×480 mm.) with silicone foam spacers and pre-bonded by placing in an air circulatory oven at 110° C. for 2 hours. The clamp assembly was removed and the pre-bonded assembly heated in an autoclave at 100 psi and 140° C. for a period of 1.5 hours. After cooling to ambient temperature at a rate of 10° C./hour, the assembly was removed.

The resulting laminated panel was completely transparent and of good optical quality and can be used as a shotgun resistant window.

The panel was tested by firing a magnum 12 bore load (46 g. BB shot) from a distance of 38 cm., two loads being fired consecutively into the same impact point. A witness card situated 350 mm. from the rear of the panel showed no damage due to emission of fragments.

EXAMPLE 2

Figure 3:
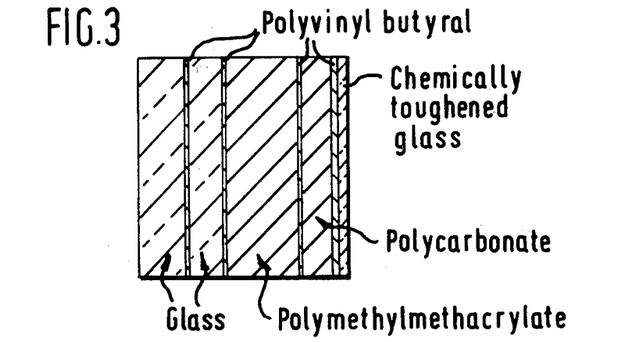
FIGS. 3–6 illustrate other preferred embodiments of the present invention.

A panel was produced as in Example 1 but omitting the 3rd, 4th, 9th, 10th layers and had the construction as shown in FIG. 3 of the accompanying drawings, in which the layers forming the hydrophilic surfaces have been omitted for the sake of simplicity. The panel was found to be resistant to 3 impacts from a 0.44 magnum pistol (15.5 g. lead bullet) 1510 fpa) fired from a distance of 3 meters. Such a panel is useful as a bullet-resistant glazing pane.

EXAMPLE 3

Figure 4:
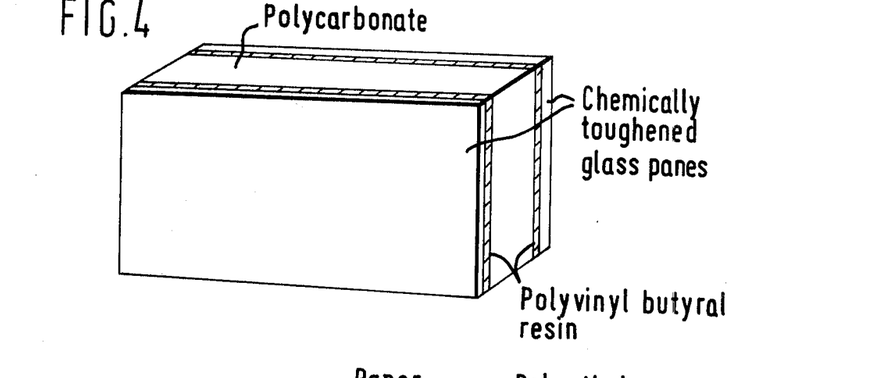

A cut piece of polycarbonate sheet of 2 mm. thickness was dipped into solution A as prepared in Example 1 and cured in a similar manner. From the coated piece was punched out a rectangular pane (50 mm. × 120 mm.) and then assembled between two chemically toughened glass panels of 1.2 mm. thickness, using a plasticised polyvinylbutyral resin as an interlayer. The interlayer material has previously been dyed red by immersion for 40 seconds in a xylene solution of Sudan red, followed by drying in air at ambient temperature. The assembly was pre-bonded at 115° C., followed by autoclaving at 100 psi and 135° C. for 30 minutes. The resulting transparent, deep red panel having the structure shown in FIG. 4 of the accompanying drawings, in which the layers forming the hydrophilic surfaces have been omitted for the sake of simplicity, was useful as an impact and scratch resistant display screen in a digital multimeter employing red light-emitting diodes.

EXAMPLE 4

Figure 5:
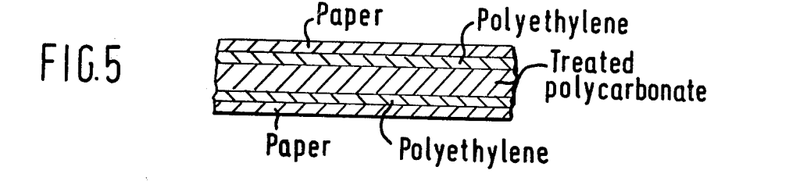

The following components were charged into a glass reaction vessel of 2.5 liters capacity, fitted with a stirrer, heating mantle and reflux condenser:
500 parts by weight N-methyl-2-pyrollidone
500 parts by weight isopropanol
100 parts by weight 2-hydroxyethyl methacrylate
80 parts by weight 2-hydroxypropyl methacrylate
4 parts by weight itaconic acid
4 parts by weight acrylamide
6 parts by weight ethyl-2-cyano-3,3'-diphenyl acrylate
4 parts by weight ethylene glycol dimethacrylate
2 parts by weight dicumul peroxide The mixture was refluxed for 2 hours, then cooled to ambient temperature and the following further components then added:
10 parts by weight tri-n-butyl tin oxide
2 parts by weight dicumyl peroxide
1 part by weight AZBN
1 part by weight polyoxyethylene lauryl ether Polycarbonate sheet of 1 mm. thickness in the form of panels (12.7 cm. × 30.5 cm.) were dipped for 45 seconds in the solution (solution B) at a temperature of 22° C. After draining for 60 seconds, the panels were placed in an air-circulatory oven at 120° C. and held at this temperature for 1 hour. After cooling to ambient temperature, shapes in the form of flat ellipses were cut from the panels and sandwiched between polythene-coated paper spacers as shown in FIG. 5 of the accompanying drawings, in which the layers forming the hydrophilic surfaces and produced by treatment of the polycarbonate have been omitted for the sake of simplicity.

The pieces were then formed to a curved shape by heating them, constrained in a male/female match-mould, to a temperature a little above the determined glass transition temperature of the plastics for a period of 5 minutes, followed by slow cooling to ambient temperature. After removing the polyethylene-coated paper spacers, the curved elliptical, optically clear, polycarbonate panes were then pre-bonded to a similarly curved glass pane by means of a plasticised polyvinylbutyral resin interlayer material by heating the assembled components under light pressure to a temperature of 115° C. for 25 minutes. The pre-bonded assembly was sealed into a polyethylene bag and autoclaved at 136° C. and 100 psi for 1 hour, then cooled slowly to ambient temperature before removal from the autoclave.

The resulting curved transparent glass/polycarbonate laminated panel was used as a visor in a full-face respirator. The interior surface was found to exhibit biocidal properties, did not fog upon breathing through the mask and, upon heavy impact, did not allow any fragments to reach the eyes of the wearer.

Figure 1:
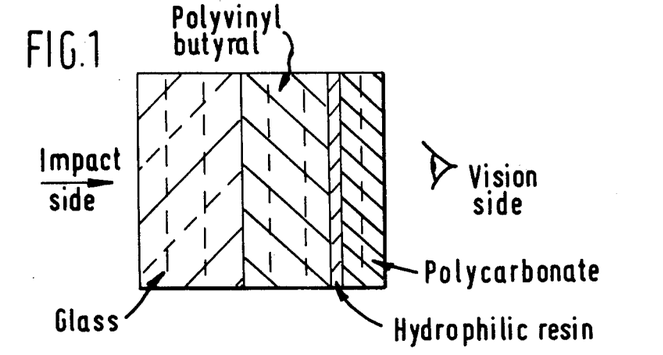
FIG. 1 illustrates a cross-sectional view of the glass-polycarbonate laminate containing a polyvinyl butyral adhesive resin and a hydrophilic resin.

To test the impact strength, a stainless steel ball of 6 mm. diameter was fired at the assembled visor at a velocity of 420 km/hr. The visor, which was 3.5 mm. thick, withstood the impact, remained gas-tight and gave off no fragments on the eye-side, although the front glass pane shattered, (see FIG. 1 of the accompanying drawings).

EXAMPLE 5

A motocycle helmet visor (15 cm. × 25 cm.; thickness 3.5 mm.) was produced similarly to Example 4. In this case, however, a polyvinyl butyral interlayer material was used which had been dyed a light green colour by immersion for 40 seconds in an 8 gm/liter xylene solution of 'Waxoline Green 5GFW'. The autoclaving cycle was carried out at 130 mm.Hg pressure and 130° C. for 1 hour, followed by cooling at a rate of 10° C./hour to anneal the visor. The result was an optically-clear, green-tinted, heat-absorbing, impact-resistant visor which had excellent scratch- and surface damage-resistant properties upon the exterior and an anti-fogging property on the interior side. The visor was tested for impact by allowing a 3.5 kg. steel spike (60° cone point) to drop from a height of 1 meter. This was carried out at −20° C. to increase the severity of the test. The point did not penetrate the polycarbonate inner pane.

EXAMPLE 6

Figure 6:
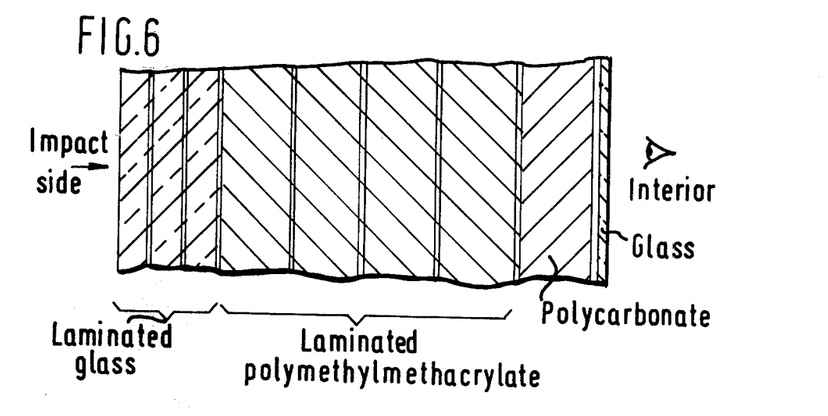

Panels of polymethylmethacrylate (4) (89 mm. × 165 mm. × 13 mm.) were cleaned in an ultrasonic bath containing anhydrous methanol and a panel of polycarbonate (89 mm. × 165 mm. × 13 mm.) was also cleaned in a similar manner. The panels were then dipped in solution B (see Example 4) for a period of 60 seconds and, after draining, placed in an air circulatory oven at 110° C. for 45 minutes. After curing the hydrophilic polymer on the surface, the panels were cooled to ambient temperature at a rate of 2° C./minute, taken from the oven and assembled with glass panes and plasticised polyvinyl butyral interlayer material in the configuration shown in FIG. 6 of the accompanying drawings, in which the layers forming the hydrophilic surfaces have been omitted for the sake of simplicity.

The assembly was clamped between steel plates with silicone rubber spacers and pre-bonded by heating for 3 hours at 95° C. in an air circulatory oven. The entire assembly was taken out of the oven and, while still hot, was sealed into a "Mylar" bag and then autoclaved at a pressure of 150 psi and a temperature of 112° C. for 1.5 hours, whereafter the assembly was cooled to ambient temperature at a rate of 7° C./hour. ("Mylar" is a Registered Trade Mark).

The resulting laminated, transparent block was useful as a vision unit in a fighting vehicle and was resistant to the impact of a 7.62 mm. 11.7 g. high velocity bullet.

I claim:

1. A reinforced glass laminate, comprising a non-hydrophilic synthetic resin selected from the group consisting of polycarbonates, polysulphones, and polyether sulphones, at least one surface of which has been rendered hydrophilic by bonding thereon a layer of a hydrophilic synthetic polymeric material, a layer of a hydrophilic synthetic resin being bonded to said layer of hydrophilic synthetic polymeric material and a layer of glass being bonded to said layer of hydrophilic synthetic resin.

2. A reinforced glass laminate, comprising a non-hydrophilic synthetic resin selected from the group consisting of polycarbonates, polysulphones, and polyether sulphones, one surface of which has been rendered hydrophilic by bonding thereon a layer of a hydrophilic synthetic polymeric material, a layer of hydrophilic synthetic resin being bonded to said layer of hydrophilic synthetic polymeric material and a layer of glass being bonded to said layer of hydrophilic synthetic resin.

3. A reinforced glass laminate, comprising a non-hydrophilic synthetic resin selected from the group consisting of polycarbonates, polysulphones, and polyether sulphones, both surfaces of which have been rendered hydrophilic by bonding thereon layers of a hydrophilic synthetic polymeric material, a layer of hydrophilic synthetic resin being bonded to each layer of hydrophilic synthetic polymeric material and a layer of glass being bonded to each layer of hydrophilic synthetic resin.

4. A reinforced glass laminate according to any of the preceding claims, wherein the non-hydrophilic synthetic resin is a polycarbonate.

5. A reinforced glass laminate according to any of the preceding claims, wherein the hydrophilic synthetic resin is polyvinyl butyral in plasticised form.

6. A reinforced glass laminate according to any of the preceding claims, wherein at least one of the laminae contains at least one component selected from filling materials, colouring materials, ultra-violet absorbers, infra-red absorbers, light filter materials, polarising filter materials and biocidal agents.

7. A reinforced glass laminate according to any of the preceding claims which additionally comprises electric conductive means.

8. A process for producing a reinforced glass laminate, wherein a non-hydrophilic synthetic resin selected from the group consisting of polycarbonates, polysulphones, and polyether sulphones is coated with a solution capable of forming a layer of a hydrophilic synthetic polymeric material thereon, the solvent medium is then removed, a hydrophilic synthetic resin is placed on the layer of hydrophilic synthetic polymeric material and glass is then placed on the hydrophilic synthetic resin, whereafter bonding together of the layers is achieved either by applying an increased pressure at an elevated temperature or by heating under reduced pressure.

9. A process according to claim 8, wherein bonding together of the layers is achieved by heating at a pressure which is not below 10 mm.Hg.

10. A protective glass panel, window, visor, lens or port, whenever comprising a reinforced glass laminate according to any of claims 1 or 7.

* * * * *